United States Patent

Knapp

[11] Patent Number: 5,901,732
[45] Date of Patent: May 11, 1999

[54] PRESSURE BALANCING DEVICE

[75] Inventor: Alfons Knapp, Biberach/Riss, Germany

[73] Assignee: Masco Corporation of Indiana, Indianapolis, Ind.

[21] Appl. No.: 08/704,683
[22] PCT Filed: Jan. 11, 1996
[86] PCT No.: PCT/US96/00494
  § 371 Date: Nov. 12, 1996
  § 102(e) Date: Nov. 12, 1996
[87] PCT Pub. No.: WO96/21819
  PCT Pub. Date: Jul. 18, 1996
[51] Int. Cl.⁶ .................................................. G05D 11/03
[52] U.S. Cl. ........................................ 137/100; 137/454.6
[58] Field of Search ........................... 137/98, 100, 454.6

[56] References Cited

U.S. PATENT DOCUMENTS

| | | | |
|---|---|---|---|
| 3,448,755 | 6/1969 | Symmons | 137/100 |
| 4,022,242 | 5/1977 | Turecek | 137/100 X |
| 4,241,749 | 12/1980 | Petursson | 137/100 |

FOREIGN PATENT DOCUMENTS

| | | | |
|---|---|---|---|
| 44650 | 4/1908 | Switzerland | 137/100 |

*Primary Examiner*—Stephen M. Hepperle
*Attorney, Agent, or Firm*—Myron B. Kapustij; Leon E. Redman

[57] ABSTRACT

A pressure balance or proportioning valve which comprises a disk-shaped mobile unit (10) having a pair of cylindrical shells (12) extending from each side of the mobile unit (10) which is axially movable in a bore (2) of a housing which contains hot and cold water inlet (5) and outlet (3, 4) pipes. The housing includes hot and cold water outlet pipes (3, 4), a cold water inlet (5) or supply pipe in one end of the bore, and a hot water inlet (5) or supply pipe at the other and opposite end of the bore. The hot and cold water supply pipes terminate in end walls (7) and have cylindrical side walls (13) adjacent the end walls with openings (14) extending radially through the cylindrical side walls (13). The mobile unit (10) is disposed intermediate the end walls (7) and moves axially, in response to unequal water pressure, in the bore between the end walls (7). Movement of the mobile unit (10) results in the cylindrical shells (12) either blocking or uncovering the radially extending openings (14) thereby equalizing the amount of hot and cold water entering the hot and cold water outlet pipes.

3 Claims, 3 Drawing Sheets

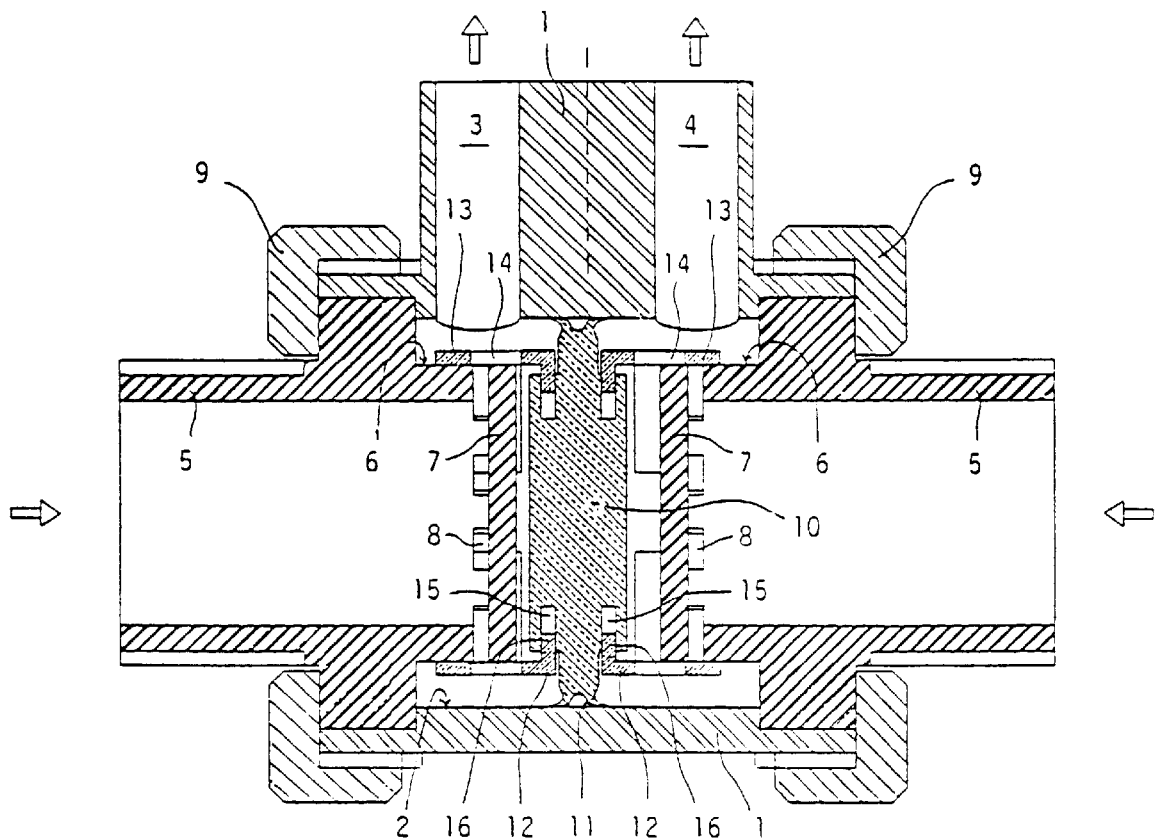
FIG. 2
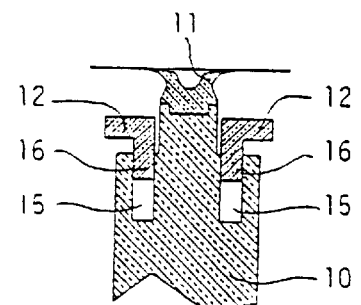 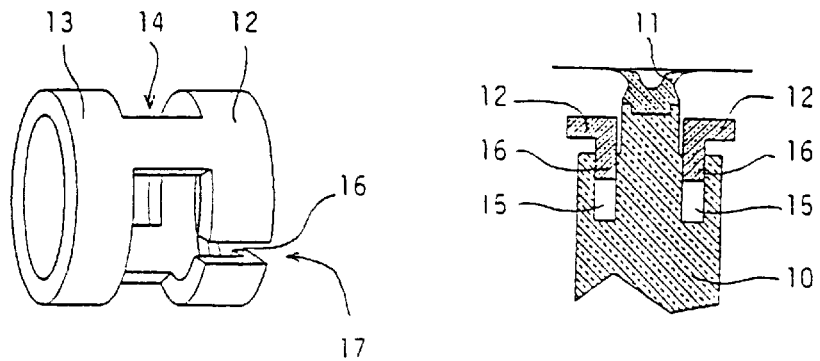
FIG. 3           FIG. 4

FIG. 7
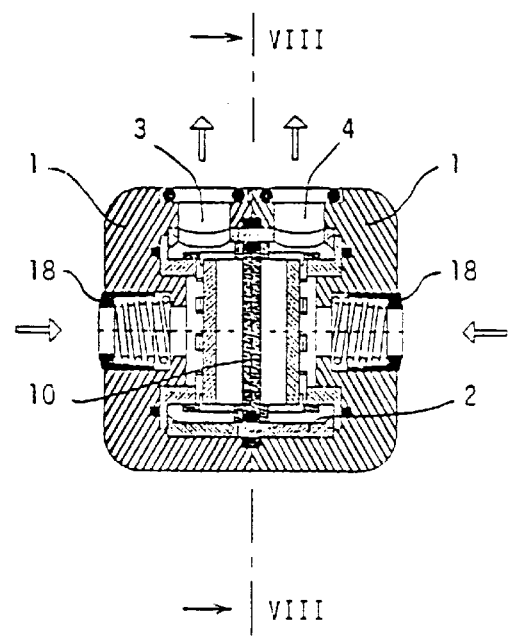
FIG. 8
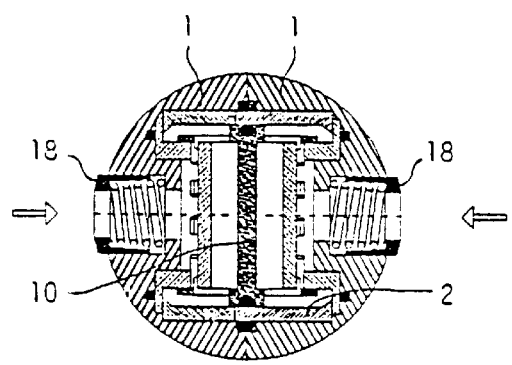
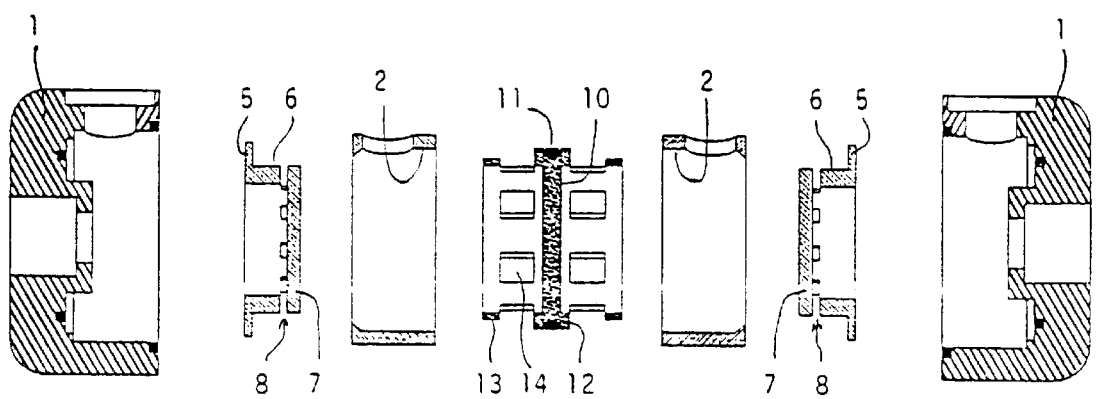
FIG. 9

PRESSURE BALANCING DEVICE

FIELD OF THE INVENTION

This invention relates to a pressure balancing device for hydraulic systems and equipment.

BACKGROUND OF THE INVENTION

Considerable pressure variations are often encountered in hydraulic systems that include hot-water and cold-water supply lines. These pressure variations are due to large, unforeseen drops in hot or cold water supply pressure. The pressure drop occurs if another faucet, a dishwasher, a washing machine or the like is turned on, or a toilet is flushed. This pressure drop results in rapid change of water temperature. In order to prevent this disturbing phenomenon a pressure balancing device is disposed in the system which compensates for pressure variations between cold and hot water supply pipelines by restricting the flow from the pipeline with the higher pressure.

Generally pressure balancing devices are of two main types: pressure balancing devices with deformable membrane and pressure balancing devices with sliding box. Both of these types of pressure balancing valves exhibit certain characteristic advantages and disadvantages.

The pressure balancing valves with a membrane comprise a mobile unit which is supported by a tight deformable membrane, and which moves when there are pressure differences between the supply lines in order to partially choke or restrict the pipeline with the greater pressure. The presence of the membrane ensures a separation between the supply lines. But the membrane itself confers features of instability upon the device. The membrane easily generates vibrations and, under certain conditions, these vibrations can attain a seriously disturbing intensity. Furthermore, in view of the structure of these devices, although the membrane may have a relatively large diameter, the useful active cross-section upon which the pressures act for the operation of the device turns out to be rather limited, so that it is necessary to make these devices relatively large in order to obtain proper operation.

Pressure balancing devices with a sliding box comprise a piston box mounted in the bore of a body which contains supply lines. They are less subject to instability and to major vibrations but they do not provide separation between the supply lines, thereby requiring nonreturn valves in the supply lines. Furthermore, the piston box has a small diameter when compared to the general dimensions of the device, and the pressure forces applied upon the box are small. Consequently, the box cannot be provided with a retaining packing or seal because that would give rise to excessive wear and tear, which impairs the operation of the device. Therefore, the box and the pertinent bore must be precision machined, which is expensive and results in easy clogging. Finally, the requirement for precision machining necessitates a metal structure from the main parts, and this leads to formation of calcium deposits that obstruct the operation and can lead to the blockage of the device.

In view of the above, the main purpose of this invention is to provide a pressure balancing device that will not be subject to phenomena of instability or to vibrations, a device that will not require particularly expensive machining, that will ensure separation between the supply lines, and in which the useful cross section subject to pressures will be as great as possible in relation to the external dimensions of the device so as to permit the production of embodiments with reduced size to enable their installation in small bodies or cartridges.

SUMMARY OF THE INVENTION

The pressure balance device of the instant invention comprises a body having a cylindrical bore which is in communication with two discharge pipelines; a mobile unit that can be axially moved in said cylindrical bore, and which is retained with respect thereto by means of a seal; two water inlet members having external cylindrical surfaces that are coaxial with said bore of the body and are disposed so as to occupy the two ends of said bore and extend inside it, each inlet member having a cavity intended to be in communication with a supply line, ending internally with a back wall and having in the vicinity of said back wall, radial passages that extend through the external cylindrical surface, said back walls of the two members being spaced on opposite sides of the two sides of said mobile unit; and a pair of cylindrical shells extending from the two sides of said mobile unit and cooperating with said external cylindrical surfaces of the two inlet members, each of said shells having a continuous wall part and passage openings, the portions of continuous wall and the passage openings of each cylindrical shell being arranged so that the passage openings will communicate with said radial passages of the corresponding inlet member when the mobile unit is in the centered position with respect to said back walls of the two inlet members, and when the mobile unit is shifted to approach the inlet member involved, said continuous wall portion of the cylindrical shell covers and partially blocks one of said radial passages in said inlet member.

The device of the instant invention does not have any tendency toward instability or vibrations, and does not require any expensive machining. The instant pressure balancing device provides separation between the supply lines, and has dimensions very close to the outside dimensions of the device. The pressures of the water supply lines exert a force upon the entire surface of the mobile unit and therefore give rise to relatively high forces that make it possible to reduce the general dimensions of the device. The entire design of the device lends itself to economic implementation, both from the manufacturing viewpoint and from the assembly viewpoint.

BRIEF DESCRIPTION OF THE DRAWINGS

FIG. 2 is an axial cross-sectional view of a second embodiment of the instant invention;

FIG. 3 is a perspective view of a cylindrical shell used in the embodiment of FIG. 2;

FIGS. 4 to 6 are partial cross-sectional views illustrating arrangements of the retaining seal for alternative embodiments of the mobile unit shown in FIG. 2;

FIG. 7 is a cross-sectional view of an embodiment of the device of the instant invention suitable for being used as a cartridge in a mixing body or in a mixing valve cartridge;

FIG. 8 is a view taken along line VIII—VIII in FIG. 7; and

FIG. 9 is an exploded view of the parts constituting the pressure balance device of FIG. 7.

DETAILED DESCRIPTION OF THE PREFERRED EMBODIMENTS

Figure 1:
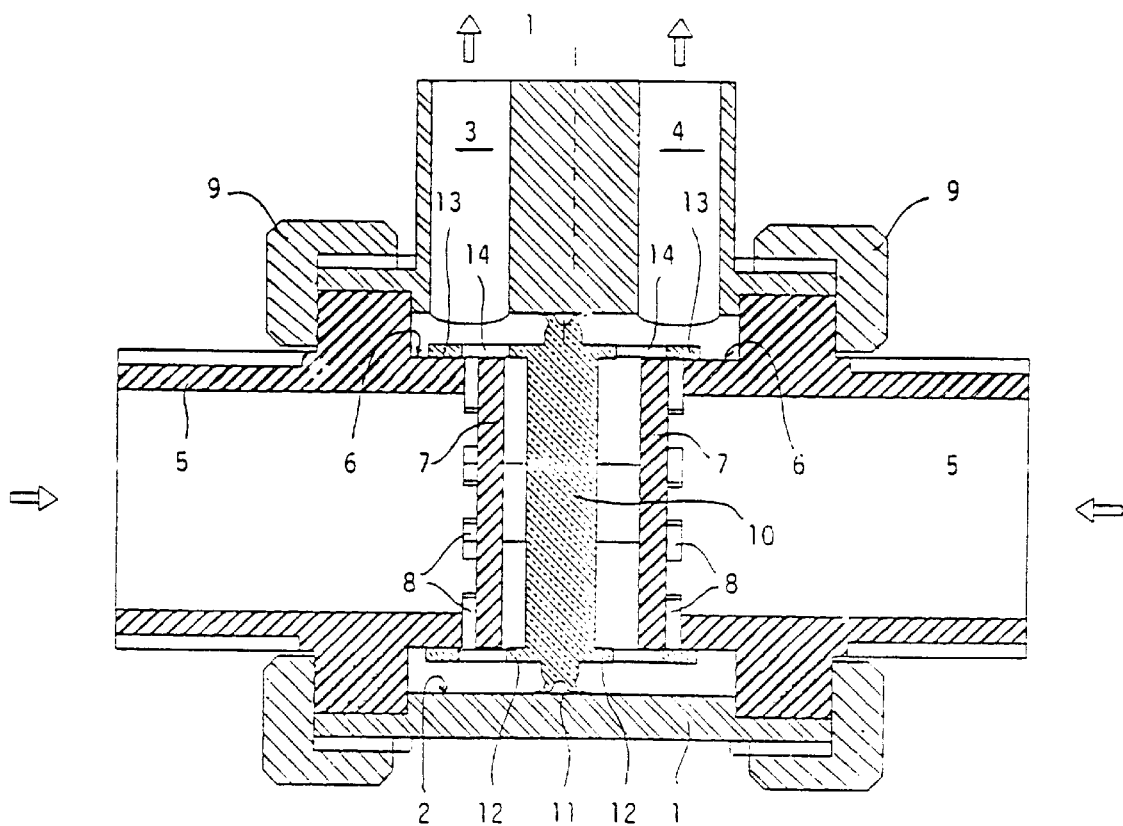
FIG. 1 is an axial cross-sectional view of the pressure balance device of the instant invention.

With reference to FIG. 1, the reference numeral 1 refers to a body having a bore 2 with two outlet pipelines 3 and 4 extending perpendicularly to bore 2. The end regions of bore 2 have two water inlet members 5, retained by screwed rings 9. Inlet members 5 are hollow and are adapted to be connected to hot and cold water supply lines. Each inlet member 5 extends into bore 2 for a certain axial distance with section 6 having an external cylindrical surface. Each inlet member 5 is closed off at its interior end by a back wall 7. Adjacent to each back wall 7 are radial passages 8 through cylindrical surface 6.

Inside bore 2 in the space between back walls 7 of inlet members 5 is disposed a substantially disc shaped mobile unit 10. Mobile unit 10 has peripheral seal 11 in contact with the surface of bore 2. Mobile unit 10 is axially movable. From the two sides of mobile unit 10 extend two cylindrical shells 12 which, at their ends, have continuous wall portions 13, and inside of which are passage openings 14. Each cylindrical shell 12 is in contact with the external cylindrical surface 6 of distribution member 5. The arrangement is such that when mobile unit 10 is in a centered position with respect to back walls 7 of distribution members 5 passage openings 14 of cylindrical shells 12 are in communication with and centered over radial passages 6 of inlet members 5. Furthermore, passage openings 14 are sufficiently wide to remain in communication with the radial passages 6 of at inlet member 5 even when mobile unit 10 is displaced from the centered resting position and approaches one or the other of members 5. In FIG. 1 the mobile unit is shown shifted to the left so that the radial passages 6 of inlet member 5 on the left are in full communication with the passage opening 14 while the radial passages 6 of distribution member 5 on the right are partly occluded.

This device works in the following manner. Assuming that mobile unit 10 is initially in a centered resting position, and that the pressures in the two supply lines which are connected to inlet member 5 are equal to each other, the pressures exert equal forces upon the two faces of mobile unit 10, and mobile unit 10 will not move from the centered position. Under these conditions, radial passages 6 are clear, and water coming from inlet member 5 flows through these radial passages and into the discharge pipelines 3 and 4. If however, for example, the pressure in the pipeline connected to inlet member 5 on the left drops or if the pressure in the pipeline connected to the inlet member on the right rises, then the pressure forces applied to mobile unit 10 are no longer equal and the mobile unit is forced to shift to the left toward the position shown in FIG. 1. It is noted that since the pressures act upon the entire surface of mobile unit 10, the forces generated are relatively great and the shifting movement of mobile unit 10 can take place without difficulty, in spite of the inevitable resistance and friction of seal 11. Due to the shift of mobile unit 10 to the left, radial passages 6 of inlet member 5 on the right are at least partly covered by continuous wall portion 13 of cylindrical shell 12 on the right, so that the water flow through said radial passages is reduced. This leads to a reduction of the pressure in discharge pipeline 4 and a corresponding reduction of the force applied upon mobile unit 10 toward the left, whereas there is no change in the pressure in discharge pipeline 3 and hence in the force applied upon mobile unit 10 toward the right. The shift of mobile unit 10 continues, increasing the choking of the radial passages on the right, until the pressures in discharge pipelines 3 and 4 have become substantially equal. At this point, mobile unit 10 stops its movement to the left, and the device has attained the purpose of balancing the pressures in the discharge pipelines. It is clear that the same phenomena occurs in reverse if the pressure in the right supply pipeline is greater than the pressure in the left supply pipeline. Therefore, the device continuously balances the discharge pressures, even though the pressures in the supply pipelines may vary.

In the embodiment just described cylindrical shells 12 are made of one piece with disc 10 of the mobile unit. Although this piece can be stamped of plastic material, its stamping may be somewhat difficult. Furthermore, to have proper operation, there need be coaxiality between cylindrical surfaces 6 of distribution members 5 and the surface of bore 2 of body 1. This coaxiality demands a certain precision in manufacturing and assembly. These difficulties are eliminated by the embodiment illustrated in FIG. 2.

In the embodiment illustrated in FIG. 2 mobile unit 10 has grooves 15 on its two sides in which are inserted the radial flanges 16 of cylindrical shells 12. Cylindrical shells 12 are separate pieces from unit 10. The shells 12 of the embodiment are illustrated in FIG. 3. Part 12 has a cut 17 that makes it possible to expand the shell to insert its radial flange 16 in the corresponding groove 15 of mobile unit 10. Cylindrical shells 12, though being axially linked to mobile unit 10, can have slight radial movements with respect to it and can hence compensate for any defect of coaxiality between bore 2 and cylindrical surfaces 6. Furthermore, it is possible to employ different materials for mobile unit 10 and for shells 12.

Figure 5:
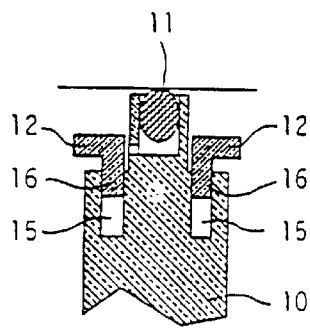
Figure 6:
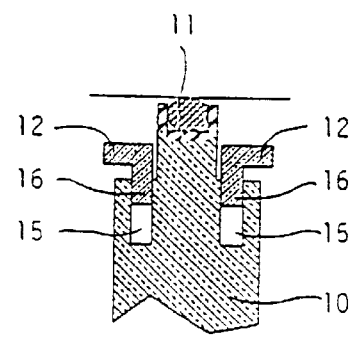

In the embodiments described so far the material constituting mobile unit 10 by itself in its peripheral portion forms bearing edge 11. This is advantageous when the material used to shape mobile unit 10 has characteristics that are suitable for constituting seal 11. When this is not the case, seal 11 can be made separately and can be connected to the mobile unit as shown in FIGS. 4 and 6. In FIG. 4 seal 11 is of the type with two lips, like the one shown as being part of the mobile unit in FIGS. 1 and 2. In the embodiment illustrated in FIGS. 5 and 6, however, the seal consists of an O-ring that-can be inserted tightly in a groove, either axially or radially (FIG. 6). It is, of course, understood that other shapes of seals can also be adopted.

FIGS. 7 and 8 illustrate how body 1 of a pressure balancing device of the invention can be easily made in the form of a cartridge to be inserted in a mixing body or to be incorporated in a mixing cartridge. In this case body I of the device is made in two adjoining parts with the interposition of a seal and both parts retained adjacent each other by the introduction of body I into a mixing body or cartridge which is adapted to receive body 1 of the balancing device. Body 1 has two seats for cup seals made of elastomer material, constituting the connection between the space inside distribution members 5 and the external supply lines (not shown). Advantageously, bore 2 assumes the character of a jacket, which also comes in two parts like body 1 in which it is inserted. As can be seen clearly in FIG. 9 all of the parts constituting the device can be mounted by means of reciprocal lineup in one and the same axial direction. This facilitates the assembly of the device. The device of this embodiment can be made with considerably reduced dimensions, and that makes it possible to install it in applications in which it would not be possible to install a currently available, conventional pressure balancing device. A particular advantage of the balancing device of the invention consists in the fact that all of the main parts of that device can advantageously be made of plastic material, thus not only reducing the cost but also practically completely eliminating the possibility that calcium incrustations might form and could thus obstruct the operation of the device.

Various modifications can be made in the balancing device described and presented by way of example without departing from the scope of the invention and claims.

What is claimed is:

1. Pressure balance device for hydraulic systems comprising;

a body having a cylindrical bore open at both ends with a hot water outlet member and a cold water outlet member in communication with said bore;

a hot water inlet member having a hollow interior having one end thereof disposed in one end of said bore and a cold water inlet member having a hollow interior having one end thereof disposed in the other end of said bore, said hot and cold water inlet members having a side wall and an end wall closing off the ends disposed in the bore, said side wall of said hot and cold water inlet members having a radially extending inlet aperture therethrough whereby said hollow interior is in communication with said bore by means of said inlet aperture;

and an axially movable mobile member disposed intermediate said end walls of said hot and cold water inlet members, said mobile member being movable toward and away from said end walls of said hot and cold water inlet members and having disposed on opposite sides thereof a cylindrical shell member with a side wall having radially extending opening therein, said cylindrical shell member being sized so that when the mobile member is centered between the two end walls of the hot and cold water inlet members the radially extending openings of said shell members are aligned with and in communication with said inlet apertures of said hot and cold water inlet members but when the mobile member is displaced off center the radially extending opening of one shell member is aligned with and in communication with one of said inlet apertures while the other of said inlet apertures is at least partially occluded by said side wall of said shell member, and wherein said mobile member has a radial groove in each side and said cylindrical shells each have a radial flange adapted to be inserted in said radial groove.

2. The pressure balance device of claim 1 wherein said cylindrical shell has an axial cut whereby the shell can be temporarily expanded to insert said radial flange into said radial groove.

3. The pressure balance device of claim 1 which is in the form of a cartridge wherein the body of said cartridge is in two parts adapted to be juxtaposed and linked in an axial direction.

* * * * *